United States Patent [19]

Saputo et al.

[11] Patent Number: 4,564,506
[45] Date of Patent: Jan. 14, 1986

[54] WATER TREATMENT DISPENSING SYSTEM

[76] Inventors: Lorraine E. Saputo; Vincent J. Saputo, both of 202 Crosswoods Rd., Branford, Conn. 06405

[21] Appl. No.: 497,089

[22] Filed: May 23, 1983

[51] Int. Cl.$^4$ .............................................. B67C 3/30
[52] U.S. Cl. .................................. 422/266; 137/268; 141/383; 206/222; 220/86 R; 222/541; 239/315; 422/261
[58] Field of Search .............. 422/261, 266, 278, 283, 422/279; 222/81, 83, 91, 541; 137/268; 206/219, 222; 141/11, 69, 382, 383, 386; 220/86 R; 239/315

[56] References Cited

U.S. PATENT DOCUMENTS

| | | | |
|---|---|---|---|
| 1,469,065 | 9/1923 | D'Arcy | 239/315 X |
| 2,094,600 | 10/1937 | Hothersall | 222/541 |
| 2,220,227 | 11/1940 | Gifford | 239/315 |
| 2,509,369 | 5/1950 | Roberson | 222/81 X |
| 2,528,530 | 11/1950 | Machleder | 206/222 |
| 2,620,234 | 12/1952 | Schaich | 239/315 X |
| 2,989,979 | 6/1961 | Karlson | 422/261 X |
| 3,083,916 | 4/1963 | Neel | 222/541 X |
| 3,236,697 | 2/1966 | Amiet et al. | 222/81 X |
| 3,397,820 | 8/1968 | Smith | 222/83 |
| 3,445,000 | 5/1969 | Litt | 422/261 X |
| 3,579,440 | 5/1971 | Bradley | 137/268 X |
| 3,846,078 | 11/1974 | Brett | 137/268 X |
| 4,059,201 | 11/1977 | Foster | 222/83 X |
| 4,164,304 | 8/1979 | Roberson | 220/257 X |
| 4,411,661 | 10/1983 | Kersten | 222/81 X |

Primary Examiner—Arnold Turk
Assistant Examiner—B. P. Heaney
Attorney, Agent, or Firm—Bachman & LaPointe

[57] ABSTRACT

A device for diluting concentrated chemicals into a receptacle. A storage container is provided for storing concentrated chemicals engageable with a receptacle and a water source for diluting said chemical and providing same in diluted form to said receptacle. The storage container is provided with a water inlet at one end and an outlet at the other end. The storage container is further provided with a collar which engages both the storage container and the inlet means of the receptacle.

7 Claims, 4 Drawing Figures

WATER TREATMENT DISPENSING SYSTEM

BACKGROUND OF THE INVENTION

The present invention resides in a method and device for diluting concentrated chemicals into a receptacle.

Conventionally, dilute chemicals are shipped in large drums, for example, either 30, 35 or 55 gallon drums. The principal component in said drums is the water diluent, with the chemical or chemicals representing a small portion of the contents of the drum. Therefore, shipment of these large drums represents a considerable expense and inconvenience in view of the inordinate size of the drums and the heavy contents which are expensive to ship.

Alternatively, one can mix chemicals and dilute same to the desired concentration at the desired site. However, this requires accurate and careful measurement in order to insure the desired concentration in the final product.

Accordingly, it is highly desirable to provide a method and device which enables one to overcome the aforesaid disadvantages.

It is a particular object of the present invention to provide a method and device for diluting concentrated chemicals into a receptacle.

It is a particular object of the present invention to overcome the disadvantage of having to ship large drums of dilute solutions, which shipment is costly and expensive and inconvenient.

It is a further particular object of the present invention to provide a method and device as aforesaid which is safe, convenient and easy to use and provides considerable economies to the user.

Further objects and advantages of the present invention will appear hereinbelow.

SUMMARY OF THE INVENTION

In accordance with the present invention the objects and advantages may be readily obtained.

The method of the present invention provides a receptacle having an inlet opening, provides a chemical storage container having a storage container outlet engageable with said receptacle inlet and a storage container inlet spaced from said storage container outlet, storing a predetermined amount of concentrated chemial in said storage container, engaging said storage container outlet with said receptacle inlet, passing water through said storage container and through said concentrated chemical from said storage container inlet to said storage container outlet and into the receptacle, thereby diluting the concentrated chemical into said receptacle.

The storage container of the present invention is a storage container for storing concentrated chemicals engageable with a receptacle and a water source for diluting said chemical and providing same in diluted form to said receptacle which comprises a storage container outlet, a storage container inlet spaced from said outlet, a concentrated chemical storage compartment for storing a predetermined amount of concentrated chemical within said storage container and communicating with said outlet and inlet, means on said storage container for fixedly securing said storage container to said receptacle, and means on said inlet for engaging a water source supply means.

BRIEF DESCRIPTION OF THE DRAWINGS

The present invention will be more readily understood from the accompanying drawings in which.

DETAILED DESCRIPTION

The method and device of the present invention offers considerable advantages. The storage container of the present invention is light, easy to handle and safe to administer. It is preferably made of unbreakable or high impact plastic which is transparent or opaque so that one can visually see the contents thereof. Alternatively, one can provide color coding. Metal cylinders may be used for particular chemicals. The chemical integrity is clearly maintained in the safe storage container of the present invention. Storage space is drastically reduced since one does not need to store the large, bulky drums. The storage container and method of the present invention permits accurate and customized discharge by the user in a safe and convenient manner. Naturally the storage container must be resistant to the particular chemical.

Importantly, the method and device of the present invention is inexpensive and efficient to use and may be returned for reuse. One can simply apply the storage container of the present invention to the receptacle and dilute the chemical in accordance with predetermined instructions. Furthermore, a simple and easy method of use is readily provided.

Figure 1:
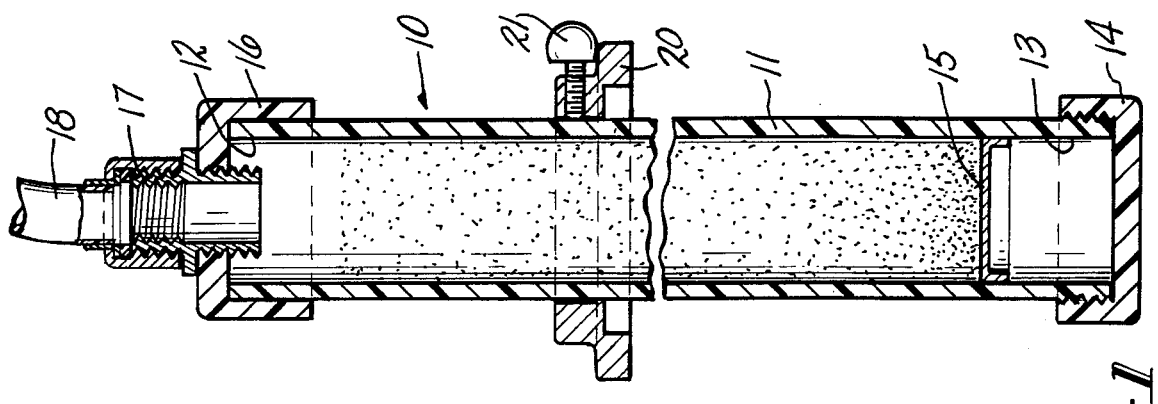
FIG. 1 is a longitudinal sectional view of the storage container of the present invention.

The storage container is shown in FIG. 1. The container 10 preferably has an elongated cylindrical body 11 of predetermined size depending upon the particular size of the drum and the amount of chemicals desired. The inner diameter of container 10 may naturally vary in size from for example 1½ inches to 12 inches. The container has an inlet end 12 and an outlet end 13. Outlet end 13 is shown covered by closing means 14 which as shown is simply a screw threaded cap which is screw threadably engaged to outlet 13. Means 15 is provided inside the storage container for retaining the chemical inside the container. In the embodiment shown in FIG. 1 means 15 is a metal foil which may be adhesively secured to the inside of container 10 and can be simply slit or scored to start the flow of chemicals. Alternatively, a tear tab may be provided. Means 15 may if desired be an elastic or paper or foil or any readily scorable material. Inlet end 12 is shown with nipple cap member 16 screw threadably engaged to inlet opening 12 and having nipple member 17 extending therefrom with screw threads for engagement with hose member 18 in a conventional manner. During shipment a cap member, not shown, may be screw threadably engaged with nipple member 17. For use, the cap member engaged with nipple member 17 is simply removed and the hose member 18 attached to the nipple member 17.

Thus, in use one simply removes cap member 14 and slits or scores foil 15 placing storage container 10 in engagement with the desired receptacle as will be shown hereinbelow. Hose member 18 is screw threadably engaged with nipple member 17 and the desired water flow commenced. Naturally, metering or valve means may be employed.

Alternatively, the nipple cap member 16 may be used in both the inlet or outlet, for example, if it is desired, to feed the chemical by a hose attachment. Alternatively, pumps can be connected in-line above or below the storage container 10, or using a bypass. In a still further alternative embodiment, one can provide integral metering means enabling commencement of chemical flow externally of the storage container.

A collar 20 is provided slidably engaged with storage container 10 including locking means 21 and means for for enabling one to snap engage the collar over the receptacle inlet.

Thus, the storage container 10 can be inserted into the receptacle to a desired depth and secured to the receptacle inlet by means of slidable collar 20. If desired, container 10 can simply be attached to, e.g., plumbed, to the receptacle and thereby virtually become a pot-type feeder, as for example when the container is larger in size than the receptacle or when direct application without insertion is desirable.

Figure 2:
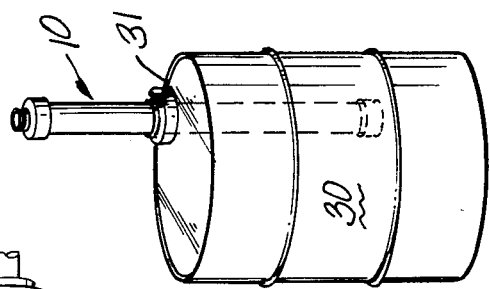
FIG. 2 is a partly schematic representation of the storage container engaged with the receptacle.

FIG. 2 shows a 55 gallon drum or receptacle 30 having a storage container 10 inserted through the inlet 31 thereof.

Figure 3:
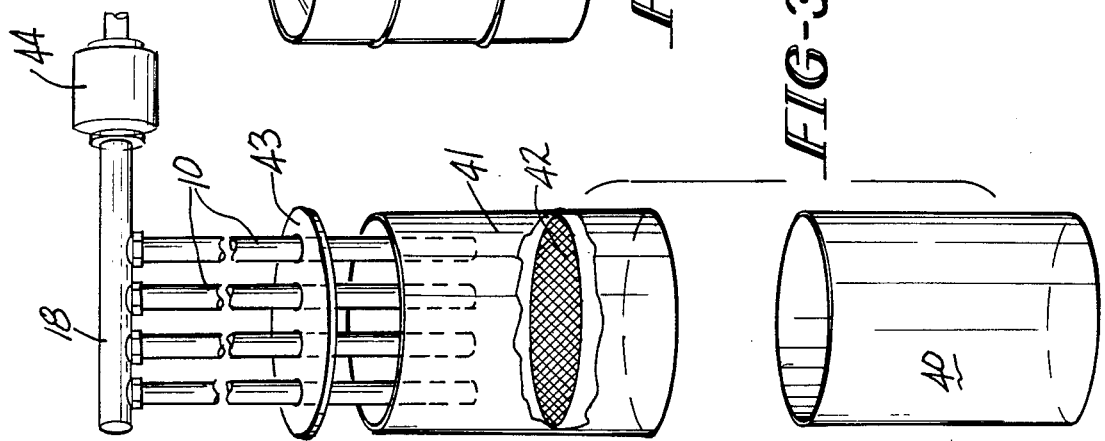
FIG. 3 is a schematic exploded view of an alternate embodiment.

FIG. 3 shows a deheaded 55 gallon steel drum 40 and liner member 41 which is insertable therein. Liner member 41 contains a removable screen 42 internally thereof to insure that all of the concentrated chemical will dissolve. Cover member 43 is removably applied to liner member 41. As shown in FIG. 3 the cover member is provided with four (4) inlet openings. Thus, four (4), or any chosen desired number of storage containers, may be utilized in order to promote easier blending of chemicals or to allow easier control of chemical addition with respect to the order of adding chemicals. Hose member 18 may be attached to all four (4) storage containers 10 as shown and thence to a flow meter 44 and to an outside water source as desired.

Figure 4:
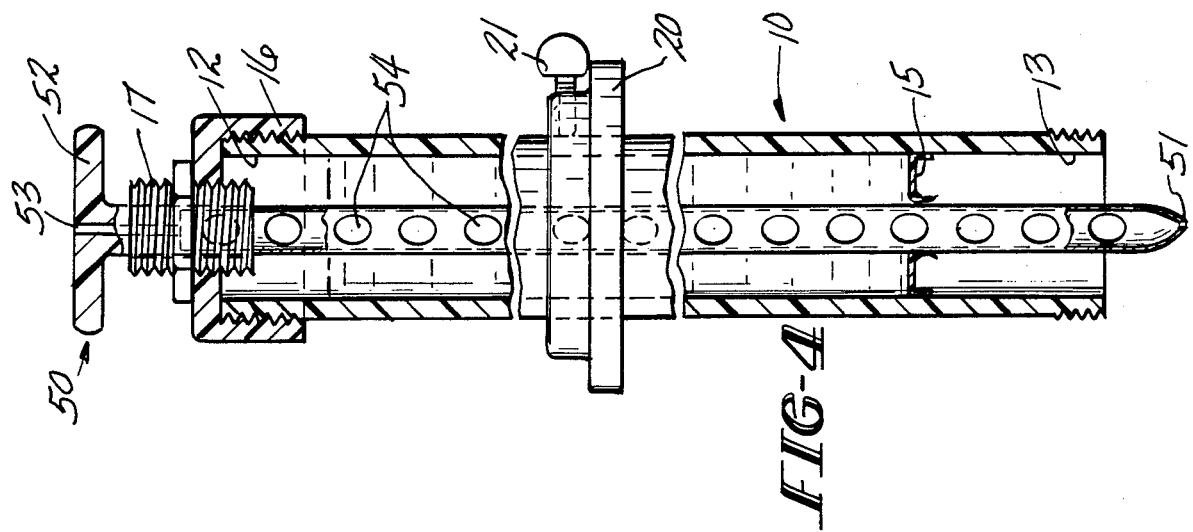
FIG. 4 is a sectional view of an alternate embodiment including the hollow rod-like member inserted in the storage container.

The alternate embodiment of FIG. 4 is particularly designed for use with liquid chemicals. In accordance with this embodiment, a hollow rod-like member 50 is insertable in said storage container and has a sharp projection 51 at one end thereof and a handle 52 with an integral air vent communicating with the inside of the rod 53 at the other end thereof. The hollow rod-like member has a plurality of openings 54 along the periphery thereof communicating with the inside of the hollow rod-like member.

Thus, rod-like member 50 is inserted through opening 12 whereupon sharp projection 51 punctures foil member 15 and allowing the liquid contents to flow through openings 54 and out outlet 13 into the receptacle. If desired, means can be provided associated with the hollow rod-like member for permitting the flow of water therethrough. Alternatively and preferably one simply removes the hollow rod-like member and provides the desired water flow in a subsequent step.

As indicated hereinabove, preferably the storage container is made of a transparent plastic material such as a strong polyvinyl chloride or polycarbonate or polyethylene material. Naturally, the particular material employed will depend on the chemicals used so that one must be certain to utilize materials which are resistant to the desired chemicals and the temperatures employed. Naturally also one can use metal materials.

The container is normally shipped in a standard cardboard or fiber shipping carton. One can provide an indicator means externally of the shipping carton and communicating with an internal portion of the carton, e.g., pH indicator paper, to identify any chemical leakage.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. The combination of a storage container for storing concentrated chemicals and a storage receptale engageable with a water source for diluting said chemicals and providing same in diluted form for storage in said receptacle which comprises: a storage receptacle having an inlet means; an elongated generally cylindrical storage container; a storage container outlet on said storage container insertable within said storage receptacle inlet means; a storage container inlet on said storage container spaced from said outlet; a concentrated chemical storage compartment within said storage container for storing a predetermined amount of concentrated chemical within said storage container and communicating with said outlet and inlet of said storage container; openable sealing means inside said storage container adjacent the storage compartment for sealing the chemical within said storage compartment when said sealing means is closed and releasing the chemical when said sealing means is open; a collar on said storage container comprising means for engaging the storage container and means for engaging the receptacle inlet means for fixedly securing said storage container to said receptacle inlet means; and means on said storage container inlet for engaging a water source supply means.

2. The combination according to claim 1 wherein said storage container is an elongated cylindrical body inserted into said receptacle inlet means.

3. The combination according to claim 1 wherein said storage container has two ends and said storage container inlet is at one end of the storage container and said storage container outlet is at the other end.

4. The combination according to claim 1 including a hollow rod-like member insertable in said storage container having a sharp projection at one end for puncturing said sealing means and a plurality of openings spaced along the periphery of said hollow member, said openings providing fluid communication between said chemical storage compartment and the interior of said hollow member, and said sharp projection having an opening permitting fluid communication between the interior of said hollow member and the interior of said receptacle.

5. The combination according to claim 1 including a plurality of said storage containers fixedly secured to a plurality of inlet means in said storage receptacle.

6. The combination according to claim 1 wherein said storage receptacle is a steel drum.

7. The combination according to claim 6 wherein said drum is deheaded and includes a liner member with a removable screen therein.

* * * * *